United States Patent [19]
Jensen et al.

[11] Patent Number: 5,443,858
[45] Date of Patent: Aug. 22, 1995

[54] COMPOSITION FOR SWEETENING MICROWAVE POPCORN; METHOD AND PRODUCT

[75] Inventors: Michael L. Jensen, Spring Lake Park; Sara J. Risch, Edina, both of Minn.

[73] Assignee: Golden Valley Microwave Foods, Inc., Eden Prairie, Minn.

[21] Appl. No.: 154,299

[22] Filed: Nov. 18, 1993

[51] Int. Cl.⁶ .......................... A21L 1/09; A21L 1/18
[52] U.S. Cl. .................................... 426/618; 426/241; 426/242; 426/93; 426/309
[58] Field of Search .................. 426/241, 242, 93, 309, 426/618

[56] References Cited

U.S. PATENT DOCUMENTS

| | | |
|---|---|---|
| 1,658,486 | 2/1928 | Howe . |
| 1,969,730 | 8/1934 | Daughters . |
| 2,222,560 | 11/1940 | Clickner . |
| 2,240,759 | 5/1941 | Chandler . |
| 2,475,133 | 7/1949 | Furter et al. . |
| 2,518,247 | 8/1950 | Nairn . |
| 2,604,407 | 7/1952 | Martin . |
| 2,648,610 | 8/1953 | Martin . |
| 2,673,806 | 3/1954 | Colman . |
| 2,702,246 | 2/1955 | Kinsella . |
| 2,843,080 | 7/1958 | Woodruff . |
| 3,102,032 | 8/1963 | Lippert . |
| 3,140,952 | 7/1964 | Cretors . |
| 3,341,331 | 9/1967 | Kimura et al. . |
| 3,537,861 | 11/1970 | Schwarzkopf . |
| 3,556,815 | 1/1971 | Fujiwara . |
| 3,580,727 | 5/1971 | Gulstad . |
| 3,617,309 | 11/1971 | Rebane . |
| 3,689,291 | 9/1972 | Draper . |
| 3,695,894 | 10/1972 | Hum . |
| 3,704,133 | 11/1972 | Kracauer . |
| 3,783,820 | 1/1974 | Hautly et al. . |
| 3,830,941 | 8/1974 | Luft et al. . |
| 3,843,814 | 10/1974 | Grunewald-Kirstein . |
| 3,851,081 | 11/1974 | Epstein . |
| 3,851,574 | 12/1974 | Katz et al. . |
| 3,882,255 | 5/1975 | Gorham, Jr. et al. . |
| 3,961,091 | 6/1976 | Caccavale et al. . |
| 3,973,045 | 8/1976 | Brandberg et al. . |
| 4,038,425 | 7/1977 | Brandberg et al. . |
| 4,053,650 | 10/1977 | Chino et al. . |
| 4,096,281 | 6/1978 | Young et al. . |
| 4,156,742 | 5/1979 | Babcock et al. . |
| 4,163,066 | 7/1979 | Mason et al. . |
| 4,219,573 | 8/1980 | Borek . |
| 4,409,250 | 10/1983 | Van Hulle et al. . |
| 4,563,366 | 1/1986 | Baird et al. . |
| 4,584,201 | 4/1986 | Boston . |
| 4,622,799 | 11/1986 | Boston . |

(List continued on next page.)

FOREIGN PATENT DOCUMENTS

| | | |
|---|---|---|
| 1307696 | 9/1992 | Canada . |
| 2680082 | 2/1993 | France . |
| 3335781 | 4/1985 | Germany . |
| 62-244360 | 10/1987 | Japan . |
| 1-027445 | 1/1989 | Japan . |

OTHER PUBLICATIONS

Richard F. Heinze, Cereal Foods World, "Developing Microwaveable Flavors for Popcorn and Cakes," Apr., 1989, vol. 34, No. 4.

Dean D. Duxbury, Food Processing, "Ingredients," Jul. 1987.

*Primary Examiner*—Joseph Golian
*Attorney, Agent, or Firm*—Merchant, Gould, Smith, Edell, Welter & Schmidt

[57] ABSTRACT

A microwaveable mixture useable for preparing a microwaveable popcorn product with the sugar-base flavoring is provided. The mixture includes unpopped popcorn a sweetening blend and a glazing blend. The sweetening blend includes an oil component and a crystalline sugar component. The glazing blend includes oil and corn syrup. Preferred blends, mixtures and methods of use are provided.

8 Claims, No Drawings

U.S. PATENT DOCUMENTS

| | | |
|---|---|---|
| 4,640,842 | 2/1987 | May . |
| 4,751,090 | 6/1988 | Belleson et al. . |
| 4,767,635 | 8/1988 | Merritt et al. . |
| 4,849,233 | 7/1989 | Hemker . |
| 4,880,646 | 11/1989 | Lew et al. . |
| 4,888,186 | 12/1989 | Cooley et al. . |
| 4,892,744 | 1/1990 | Ylvisaker . |
| 4,904,487 | 2/1990 | LaBaw et al. . |
| 4,904,488 | 2/1990 | LaBaw et al. . |
| 4,927,645 | 5/1990 | Lee . |
| 4,927,648 | 5/1990 | Ylvisaker . |
| 4,948,606 | 8/1990 | Huanj et al. . |
| 4,956,193 | 9/1990 | Cain et al. . |
| 5,002,785 | 3/1991 | Lew . |
| 5,035,904 | 7/1991 | Huang et al. . |
| 5,069,923 | 12/1991 | Hubbard et al. . |
| 5,108,770 | 4/1992 | Domingues et al. . |
| 5,108,772 | 4/1992 | Wilbur . |
| 5,132,125 | 7/1992 | Lew et al. . |
| 5,215,770 | 6/1993 | Aramouni . |
| 5,223,289 | 6/1993 | Domingues et al. . |

COMPOSITION FOR SWEETENING MICROWAVE POPCORN; METHOD AND PRODUCT

FIELD OF THE INVENTION

The present invention relates to microwave popcorn. The invention particularly concerns methods and compositions for flavoring microwave popcorn. Specifically, the invention concerns flavoring microwave popcorn with a sweetened flavoring and glaze in a manner such that the sweetener and glaze can be enclosed with the popcorn in an unpopped state, and the popcorn can then be cooked or popped in the presence of the sweetener and glaze. The invention also concerns compositions for use according to the method of flavoring; and, the resulting product.

BACKGROUND OF THE INVENTION

Microwaveable popcorn (sometimes referred to as microwave popcorn) has become a very popular consumer item. In general, the form of product obtained by the consumer comprises unpopped popcorn enclosed within a disposable container, such as a paper or fiberboard container. In some instances microwave susceptors are provided within the arrangement, to facilitate collection of microwave energy and heat transfer to the product. The product is typically used by placing the container, with the unpopped popcorn therein, inside a microwave oven. After exposure to microwave energy in a conventional microwave oven for about 1-5 minutes, about 95% of the popcorn generally converts to its popped form, for consumption. Microwave popcorn arrangements are described, for example, in U.S. Pat. Nos. 5,044,777; 4,548,826; 4,691,374; and, 4,450,180, the disclosures of which are incorporated herein by reference.

In general, for many microwave popcorn products, the popcorn is enclosed in the container in the presence of an oil or fat, to facilitate the popping process. The oil or fat operates as a heat sink for energy during the operation, and facilitates retention of heat within the container to help the popcorn pop to its fullest.

Many efforts have been directed toward providing flavorings on the popcorn. Butter, salt or similar flavorings, for example, are sometimes included within the fat/oil in the bag, to transfer flavoring to the popcorn as it is popped.

Sweetened popcorn products have enjoyed a substantial popularity. For example, caramel popcorn is a popular product. In general., many products for sweetening microwaveable popcorn are provided in a multi-step form. In such a flavoring process, the popcorn is first popped, in the absence of the sweetened flavoring. The sweetened flavoring, appropriately warmed, is then spread over the popcorn, usually with intermittent shaking, before consumption. That is, the popcorn is not provided in the presence of the sweetened coating until after the popcorn has been popped. Such processes are referred to herein as multi-step, because of the separate steps for the consumer of cooking the popcorn and providing the sweetened coating on the cooked popcorn.

A principal reason why such sweetening processes have generally been utilized for microwaveable popcorn is that sugars present in sweetened flavorings tend to burn in conventional microwaveable systems, as the popcorn is popped. Thus, if a conventional caramel flavoring is provided in the container with the unpopped popcorn, and the container of unpopped popcorn, in contact with the caramel flavoring, is exposed to microwave energy, in general there is a tendency for the sugars in the flavoring to scorch, burn or decompose to an undesirable extent during the process, before the popping of the popcorn is completed. This leads to an undesirable taste, texture and/or aroma, for the consumer.

It has been widely recognized that it would be desirable to develop a system for sweetening microwave popcorn, whereby the sweetened flavoring could be provided in contact with the unpopped popcorn in the container, and be exposed to the microwave energy during the popping process. In this way, the consumer would only need to place the product in the microwave oven, for the appropriate period of time, and then open the product to consume the sweetened popcorn.

One approach for developing a microwaveable glazed popcorn, that is popped in the presence of a sweet. (sugar-containing) mixture, is described in Belleson et al., U.S. Pat. No. 4,751,090. According to the reference, water is utilized in the coating composition, to slow down the temperature rise of the coating during exposure to microwave energy.

SUMMARY OF THE INVENTION

According to the present invention, a microwaveable mixture useable in preparing a microwaved popcorn product with a sugar based flavoring is provided. In general, the mixture comprises unpopped popcorn, a sweetening blend and a glazing blend. The sweetening blend comprises an oil component having a melting point of at least 115° F. (46° C.), preferably at least 120° F. (48°-49° C.), and a crystalline sugar component having a moisture content of no greater than about 2% and preferably no greater than about 1.5% by weight.

Preferably the crystalline sugar component comprises a granulated sugar. The crystalline sugar component may comprise a mixture of various sugars including, for example, the following sugars of combinations of them: selected white sugar, selected brown sugar and selected honey flavored-sugar granules, and selected maple sugar granules depending on the particular recipe used and flavor desired.

In preferred mixtures according to the present invention a glazing blend is provided. The glazing blend preferably comprises a mixture of corn syrup and an oil; the oil having a melting point of at least 115° F. (46° C.), preferably 120° F. (48°-49° C.) or above. In preferred mixtures, according to the present invention, including both a glazing blend and a sweetening blend, preferably the total moisture content of the sweetening blend and glazing blend together is no more than about 20% by weight, preferably no more than about 14% by weight; most preferably about 12% or less. Also, in such compositions, preferably the total NaCl content is no more than about 200 mg (milligrams) per 100 g (grams) total of glazing blend and flavoring blend. Most preferably, the sodium chloride content is no more than about 140 mg per 100 g total of glazing blend and sweetening blend.

In preferred compositions, the sweetening blend comprises 35-55% by weight sugar, and 35-55% by weight oil having a melting point of at least 115° F. (46° C.).

The blends may include other flavoring agents, for example butter flavoring, vanilla, caramel, cocoa (chocolate) cinnamon, or the like. The flavorings may be in either the sweetening blend, the glazing blend, or both.

In preferred compositions, the glazing blend should include about 10–20% by weight of oil having a melting point of at least 115° F. (46° C.), and about 80–90% by weight corn syrup.

In preferred compositions, according to the present invention, the oil in both the sweetening blend and the glazing blend is a food grade cottonseed oil blend having a melting point of about 120° F. (48°–49° C.).

Compositions according to the present invention can be formulated to provide a variety of specific preferred sweetened flavorings for popcorn. In a preferred caramel flavoring, the sweetening blend comprises a crystal sugar component which is a mixture of a selected white sugar and a selected honey-flavored sugar; and, the flavoring blend also includes vanilla and butter flavorings. For that preferred composition, the glazing blend includes caramel flavor, oil and corn syrup. Other preferred formulations, for alternate flavorings, are provided in the examples.

Also according to the present invention, a sweetened flavoring blend for addition to unpopped microwaveable popcorn is provided. In general, the preferred sweetened flavoring blend is as described above with respect to the mixture with the popcorn.

In addition, according to the present invention a method of preparing sweetened microwave popcorn is provided. The method generally comprises steps of adding a sweetening blend as described herein to the popcorn, adding a glazing blend to the unpopped popcorn as well; and, exposing the mixture of blends and unpopped popcorn to an appropriate level and amount of microwave energy to pop the popcorn. The result is, without multiple steps of cooking, a sweetened popcorn product. Thus, from the consumer's perspective, products according to the present invention are "one-step". That is, the consumer places the item into the microwave oven, pops the popcorn and opens the bag to consume the popcorn. No separate step of flavoring addition is included.

DETAILED DESCRIPTION OF THE INVENTION

As indicated above, the present invention relates to the preparation of sweetened microwaveable popcorn. The invention particularly concerns the provision of system, whereby the sweetened flavoring is provided in a package with unpopped popcorn and the package is exposed to microwave energy to pop the popcorn. The sweetened flavoring is thus provided in contact with the popped popcorn without a separate step of flavoring addition after popping. The invention particularly concerns methods and compositions for the preparation of such popcorn such that undesirable levels of burning (scorching) of sugars in the flavoring do not occur.

In general, the popping temperature for popcorn is about 350° F. (176° C.). Thus, for microwave popcorn to pop, sufficient microwave energy must be absorbed for the popcorn to be heated to approximately this extent.

In general, sugar sweetened flavorings are subject to substantial scorching (caramelization or decomposition), as they are exposed to temperatures of the order of those required for popping popcorn. While small amounts of such caramelization or decomposition are acceptable, at higher levels they will render undesirable taste, texture or aroma to the product. A key issue in developing an acceptable microwaveable popcorn system, with a sweetened flavoring, is the development of a mixture such that the popcorn will have completed popping prior to the sweetened flavoring having been sufficiently exposed to heat for undesirable levels of sugar scorching to have occurred.

Development of methods, compositions and products according to the present invention were based, in part, upon a number of observations made during experimentation with sweetened flavoring for microwave popcorn products, at the research facilities for the assignee of the present invention, Golden Valley Microwave Foods of Eden Prairie, Minn. 55344.

One of the observations was that when solid or crystalline sugars having a moisture content of greater than about 2% are utilized in flavorings for microwaveable popcorn, the incidence of undesirable levels of scorching was generally increased. Alternatively, when sugars having moisture content of 2% or less, preferably 1.5% (and sometimes 1%) or less, were utilized in the formulations lower levels of undesirable caramelization/decomposition were observed.

Further, it was observed that when finely powdered sugars are utilized in the compositions, the incidence of undesirable levels of scorching or low levels of popping was greater. In general, finely granulated, as opposed to powdered, sugars were observed to provide compositions with less incidence of undesirable scorching with high popped volume during the microwave popping operation.

Further, when brown sugars containing substantial levels of molasses therein were used, higher incidence of undesirable levels of decomposition were observed. When sugars with little or no molasses were used, less problem with burning resulted.

Another important factor, relates to the melting point of the oil used in the composition. The typical oils used in conventional non-sweetened microwave popcorn compositions have a melting point of about 105° F.–107° F. (40°–42° C.). In general, when compositions prepared for sweetened flavorings (added to popcorn before microwave popping) have involved such oils, the incidence of undesirable levels of sugar burn are observed to be relatively high and unacceptable. On the other hand, when food grade oils having melting points of about 120° F. (49° C.) and above are utilized in place of the conventional oils, in similar compositions, a lower incidence of undesirable burn was observed.

A significant observation was made with respect to the presence of salt (NaCl) in the flavoring compositions. In general the level of undesirable decomposition or sugar burn was observed to be greater, when substantial levels of salt were provided in the compositions. On the other hand, when the flavoring compositions were relatively salt-free (generally including less than about 200 mg of salt per 100 gram total of composition added to the unpopped popcorn, preferably less than 140 mg per 100 gm of total composition added) a significantly lower level of undesirable burn or decomposition resulted.

Finally, a significant observation was made with respect to the total moisture content of the composition added to the unpopped popcorn. Specifically, it was observed that if the total moisture content of the blends added to the unpopped popcorn (i.e. disregarding popcorn weight) was below about 20%, by weight, and preferably less than about 14% by weight (most preferably about 12% or less) significantly lower levels of undesirable sugar burn were observed, relative to compositions with higher amounts of moisture therein.

Based on the above observations, general compositions and processes for the production of sweetened flavoring systems for microwaveable popcorn have been developed. In general the preferred approaches can be characterized by the following:

1. Preferred utilization of finely granulated, but not powdered, sugars having a relatively low moisture content, preferably 2% (by weight) or lower, more preferably 1.5% or lower and where possible 1% or lower (by weight);
2. Preferred utilization of a food grade oil having a melting point of at least about 115° F. (46° C.), preferably about 120° F. (49° C.) or higher;
3. An overall total composition added to the unpopped popcorn having a total moisture content of no greater than about 20% by weight (preferably 14% or lower; most preferably about 12% or lower); and,
4. A sodium chloride content in the total composition added to the unpopped popcorn of no greater than about 200 mg per 100 grams total weight of sweetening composition; preferably no more than about 140 mg per 100 grams of total composition added to the unpopped popcorn.

Also, preferred ratios of sweetening composition to unpopped popcorn have been developed. Details with respect to these are provided below, and specific preferred formulations and components are discussed.

Based upon the above observations, and successes in the development of useable compositions and methods, several theories with respect to the successes achieved by compositions according to the present invention have been developed. It is noted that the theories presented are based on speculation, and the inventors do not wish to be held to any particular theory. However, the proposed theoretical presentation is useful as a working guide for assisting those practicing the invention.

First, with respect to sodium chloride presence, it is believed that when sodium chloride dissociates the sodium ion behaves, in the presence of a microwave field, similarly to a tiny sliver of metal. In particular, intense local heating develops, which can lead to enhanced rates of sugar scorch. In general, then, it is desireable to provide sweetening coatings containing as little dissociated sodium chloride therein, as reasonably possible.

In general, it is also believed the sugar particulates (solid or crystalline), in the sweetening suspension are, in effect, protectively encapsulated within the oil and other liquid material in the composition, when the flavoring slurry is prepared. This appears to help protect the sugars from rapid transfer of heat thereto, and thus, to inhibit undesirable levels of burning. If the sugar is powdered, very high surface area is presented, and less effective encapsulation occurs, for a given level of oil presence. Thus, finely granulated sugars are generally preferred to powdered sugars in compositions according to the present invention. Also, when the sugar is powdered, the resulting mixture with the oil tends to be thicker and more viscous, rendering the oil less effective in promoting a large volume of popped kernels.

It is also believed that the use of higher melting point oils (i.e. at least about 115°–120° F.) inhibits scorching relative to that which occurs with lower melting point oils (i.e. 105°–107° F.) because the higher melting point oils retain encapsulation of the sugars to a higher degree.

It can also be speculated that the moisture presence in sugar works to disfavor desireable flavoring in compositions as follows. Water, of course, is microwave active. Under the conditions of exposure to microwave energy for popping popcorn, water in the sugar will absorb microwave energy, with a resulting temperature increase above the vaporization point of the water. As the water vaporizes it is "blown from" the sugar. It can be speculated that as the water is blown off the sugar, it blows some of the encapsulating oils from the surface of the sugar, exposing the surface of the sugar directly for scorching. If the moisture content of the sugar is maintained relatively low, less moisture release occurs, with less exposure of the sugar occurring. A similar analysis may explain why relatively low moisture content in the overall slurry is also desireable.

Brown sugars containing substantial amounts of molasses therein appear to be subject to a similar problem. That is, the molasses may either, through entrapment of moisture or similar reasons, cause the sugar to be more susceptible to microwave heating, then sugars that do not contain molasses. The excitement of the molasses or the moisture of the molasses during the exposure to microwave energy will generally tend to promote loss of the encapsulating oils from the surface of the sugar. The result is an enhanced scorching of the sugar.

The Level of Sugar Scorching in Compositions and Methods According to the Present Invention It will be understood that a goal of the present invention is the provision of compositions and methods for providing sweetened flavoring in glazed microwave popcorn products, whereby the sweetened flavoring and glaze are added to the popcorn before popping and, in use, the popcorn will pop before undesirable levels of caramelization/burning (scorch) of the sugars in the sweetened flavoring occurs. In this context "undesirable levels" means levels sufficient to provide a taste, aroma or texture undesirable to the consumer. It is not a requirement of compositions and methods according to the present invention that absolutely no burning or caramelization occur. Rather, it is generally a goal or requirement that the levels be sufficiently low so that the product and composition are generally acceptable to the consumer. A principal concern, then, was in generally developing a composition and method such that the rate of scorching of the sugars is sufficiently low so that in normal use the popping and glazing process will have been completed before undesirable levels of scorch have occurred.

Sweetened Flavorings Generally

The techniques described herein may be utilized in a wide variety of sweetened flavoring compositions. In general, the term "sweetened compositions", "sweetening blend" and variants thereof, as used herein is meant to refer to compositions which have contained in them various amounts of added food grade sugars, for sweetening. A variety of sugars may be utilized. It is foreseen that, typically, sucrose products will be the preferred form of sugar. However, the term "sweetener", "sugar" and variants thereof, as used herein is meant to be construed broadly to mean any mono-, di- or trisaccharides which possess the properties of a crystalline, food grade, sweetener.

The Provision of a Glaze

In general, consumers typically prefer a semi-hardened glaze on sweetened popcorn products. Such a glaze is similar to the one provided, for example, on conventional, not microwaved, caramel popcorn. The glaze can be readily provided through an appropriate provision of corn syrup in the composition added to the unpopped popcorn. In general, what is required is sufficient corn syrup be provided to coat the quantity of popcorn used. In general, in compositions according to the present invention about 40–55 grams of corn syrup per 40 grams of popped popcorn (or about 48 grams unpopped) will be sufficient and preferred. Since typical corn syrup products contain substantial amounts of water (typically about 20% by weight) therein, the total amount of corn syrup relative to the amount of sweetener is of some concern.

A glaze is desireable for a number of reasons. First, it generally provides a desireable texture to the sweetened popcorn, for the consumer. In the absence of the glaze, many formulations for sweet popcorn would tend to provide sticky products. Also, the glaze presents an attractive appearance and aroma, especially, in combination with the various sweeteners. Further, the syrup, which cooks to form the glaze, facilitates distribution of the sweetener throughout the popped popcorn.

In general, it has been found that when the preferred components used in sweetened flavorings or blends according to the present invention are mixed with corn syrup, undesirable separation results. Thus, in preferred methods and compositions according to the present invention the sugar or sweetened flavoring (or blend) is provided as one blend or slurry, and the glaze or corn syrup is provided as a separate blend or slurry. Each slurry (or blend) is added separately to the popcorn, in preparing the product. Details with respect to this are provided in the following descriptions.

Preferred Compositions and Methods

As indicated above, in preferred compositions according to the present invention not only is a sweetened blend provided, but also corn syrup (or glaze blend) is provided to lead to a glaze of the resulting product. In general, the commercial product is prepared as follows. First, an appropriate amount of unpopped, microwave poppable popcorn, is provided in the package. A first blend including the sugar and oil is then added to the popcorn, A second blend, including the corn syrup, is added after the first blend. (Various flavorings may be provided in the sweetening blend, the glazing blend, or both.) The product is then sealed and is ready for popping (or distribution to the consumer). In preferred applications, the sugar flavoring or blend is usually added to the popcorn first. This is because, due to its oil content with no corn syrup, it is relatively fluid and can pour through and mix with the kernels. Typically, blends including corn syrup are thicker and do not flow quite as well.

The product can be popped by simply placing the container with the mixture of unpopped popcorn, flavoring and glaze therein, in a microwave oven and exposing the combination to microwave energy for about 2–7 minutes (on high or full power for typical compositions and conventional ovens). Conventional container arrangements, such as described in U.S. Pat. No. 5,044,777, especially FIG. 2, incorporated herein by reference, can be used and are preferred. Preferably, the paper from which the package is made comprises a 2-ply system, e.g. an inner parchment grease-proof kraft paper of 27 pounds/ream, laminated to an outer bleached grease-proof kraft paper of 23 pounds/ream by means of a suitable adhesive with a microwave susceptor between the two plys.

The preferred compositions described below, and in the examples, not only demonstrate a preferred lack of sugar scorch, but also preferred glaze, product texture, aroma and taste. Also, the blend recipes can be easily and conveniently formulated and applied.

The Sweetening Blend

Of course, the specific composition of the sweetening blend will be varied, depending upon the specific flavoring desired. For example, chocolate, caramel, cinnamon, honey or fruit flavorings can be prepared according to the principles of the present invention. In the examples, specific flavoring compositions are provided, which demonstrate utilization of the general principles as disclosed herein to achieve specific types of flavorings.

In general, the sweetening blend should comprise a slurry of the appropriate sugars and flavors, and a food grade oil having a melting point of at least 115° F. (46° C.), and preferably at least 120° F. (49° C.). A useable and preferred oil is a cottonseed oil blend, such as that available under the designation 478C from Cargill Corporation, Minnetonka, Minn. Cargill 478C has a melting point of 120° F. (about 49° C.). Another useable oil is Cargill 780, a cottonseed blend having a melt point of 120° F.

The particular sugar components used, will depend upon the specific flavoring being sought. If a crystalline "white sugar" is to be used, preferably a fine grind granulated sugar rather than a powdered sugar, is selected. The "white sugar" should, preferably, have a moisture content of no greater than about 2%, more preferably no greater than about 1%, by weight. A granulation on the order of about 100% through U.S.S. (United States Standard) #12 sieve (maximum) and 100% through U.S.S. #30 sieve (minimum) is typically preferred. The commercially available product sold under the designation "extra fine grind granulated sugar" from C&H sugar of Concord, Calif., is a useable and acceptable product as a white sugar in compositions according to the present invention. The C&H product has a moisture content of less than 1% and it falls with the granulation range stated. It is noted that typically white sugars have a moisture content of 2% or less by weight.

Certain specific flavoring compositions according to the present invention may call for the utilization of a brown sugar flavor and/or a honey flavored sugar. When a brown sugar is called for, for example in a caramel coating, the product sold under the designation "Domino granulated brown sugar" by Domino Sugar Corp. of New York, N.Y. 10036, is an acceptable and useable material. In general, if brown sugars are used, zero molasses content or molasses contents as low as possible should be used. A moisture content on the order of about 1.0% (by weight) or less is also desired. Granulation in the brown sugar on the order of about 100% through U.S.S. #12 sieve (maximum) and 100% through U.S.S. #30 sieve (minimum) will be acceptable. Domino granulated brown sugar comprises 0.75% moisture by weight, and corresponds to a granulation of 6% maximum through U.S.S. #16 sieve and 92% min.

through U.S.S. #50 sieve and a trace through U.S.S. #100 sieve.

If the flavoring calls for the presence of honey flavored sugar granules, in the sweetening blend, an acceptable commercially available product for such use is available under the designation honey flavored granules, from Domino Sugar Corp. of New York, N.Y. In general a moisture content in honey flavored granules on the order of about 1.5% (by weight) or less will be preferred. Also, a granulation of such sugar materials on the order of about the same as described for white and brown sugars will be preferred. The product identified from Domino Sugar Corp. comprises 100% through U.S.S. #12 sieve (max) and 100% through U.S.S. #30 sieve (min). Another useable sugar comprises Domino's granulated maple sugar, which has a moisture content of 1.5% or less, by weight, and a granulation about the same as the Domino brown sugar.

The sweetening blend may include a variety of flavoring additives or coloring additives, depending upon the particular taste, texture and appearance desired. Vanilla flavorings, caramel flavorings, butter flavorings, cocoa, fruit flavorings, coconut, cinnamon and the like can be utilized, depending on the results sought. (Some or all of these may also in some instances be provided in the glazing blend.) Examples of specific useable recipes are reported herein. From these, general applications of the present invention will be understood. In general, all that is required is that a sufficient amount of the flavorings be utilized to achieve the desired flavoring result. In general, according to the principles outlined above, preferably in the added flavorings significant amounts of salt and moisture are avoided.

A preferred method for preparing the sweetened blend is as follows. The oil is melted and held at an appropriate temperature for mixing (typically about 135° F., i.e. 57° C., for an oil having a melting point of 120° F., i.e. about 49° C.). The sugars and flavors are blended in, with mixing. A total mixing time on the order of about two minutes will generally be sufficient. The blend is then ready to be poured over the unpopped popcorn.

The amount of blend which should be utilized, for a given amount of popcorn, is generally not critical to avoidance of undesirable sugar burn. Typically, for cost reasons and consumer preference, it will be desirable to use the least amount of slurry from which a selected or desired level of sweetening and coating of the popcorn will result. In general, preferred sweetening blends will comprise 35–55% by weight, preferably about 45–55% by weight, of the oil component and 35–55% by weight, preferably 45–55% by weight, sugar; and, the ratio of sweetening slurry to unpopped popcorn, by weight, will be on the order of about 0.5/1 to 1.5/1, and typically about 0.8/1 to 1.2/1. With oil contents with the range stated, generally the blends will have sufficient fluidity at about 135° F. (57° C.), to be easily poured over unpopped kernels.

The Glaze

In general, a glaze or glazing blend useable in compositions and methods according to the present invention comprises food grade corn syrup mixed with an appropriate oil, in the presence of an appropriate emulsifier to maintain suspension. Flavorings may be added, if desired. The oil is preferably an oil having a melting point of 115° F. (46° C.) or higher, and preferably 120° F. (49° C.) or higher, for reasons similar to those stated above with respect to the oil in the flavoring composition. A preferred oil is the same oil as that identified above as the preferred oil for the sweetening composition, namely a cottonseed blend having a melting point of 120° F. or about 49° C. (i.e. Cargill 478C).

A variety of corn syrups may be used. In general a light corn syrup, such as available from CPC International Corp., Englewood. Cliffs, N.J., under the name Karo is useable and preferred. This material comprises about 20% by weight moisture, and thus the total amount used should be controlled, to provide a moisture content in the total mixture of glaze and sweetening blends of no more than the preferred upper limit of 20%, more preferably no more than 14%, by weight and most preferably about 12% or less.

The corn syrup glaze is generally prepared by melting and holding the oil at an appropriate temperature for mixing (again typically about 135° F. or about 57° C. for an oil having a melting point of about 120° F. or about 49° C.). The emulsifier, typically lecithin, is then added with mixing. Next the corn syrup is poured in, with mixing until the corn syrup and oil become a homogeneous mixture. In some blends flavorings may also be added to the glaze.

The relative amount of oil to corn syrup can be varied greatly. In general, all that is needed is a sufficient amount of oil to provide for a slurry that possesses sufficient fluidity that it can be readily spread over the popcorn in use. Preferably, the glazing blend comprises 10–20%, by weight, oil and 80–90%, by weight, corn syrup. The amount of emulsifier (lecithin) may be varied; and, in general it need only be a sufficient amount to ensure homogeneous mixing. A weight ratio of oil to lecithin on the order of about 35/1 (or within the range of 40/1 to 15/1) will typically be sufficient to accomplish this.

The total amount of corn syrup blend added need only be sufficient to provide enough corn syrup to yield the amount of glaze desired. Generally a weight ratio of corn syrup to popcorn on the order of about 0.5/1–1.5/1, and preferably about 1.15/1 will be sufficient.

EXAMPLES

EXAMPLE 1 (Caramel Flavor with Brown Sugar)

This example presents a formulation and method for the preparation of a acceptable caramel flavored popcorn. The example is formulated to prepare a bag of product containing about 55 grams of unpopped popcorn (410–440 kernels).

The compositions of the two blends are as follows:

| The Caramel Flavor/Sweet Blend | |
|---|---|
| Extra fine grind granulated sugar[1] | 14.0 grams |
| Granulated brown sugar[2] | 10.0 grams |
| Honey flavored granules[3] | 4.0 grams |
| Oil[4] | 30.0 grams |
| Vanilla flavor[5] | 1.0 gram |
| Caramel flavor[6] | 0.7 gram |
| Butter flavor[7] | 0.3 gram |
| The Corn Syrup Blend | |
| Light corn syrup[8] | 42.0 grams |
| Oil[9] | 18.0 grams |

| | |
|---|---|
| -continued | |
| Emulsifier[10] | 0.5 grams |

[1] C&H extra fine grind granulated white sugar having a moisture content of less than 1%, by weight.
[2] Domino granulated brown sugar, having a moisture content of less than 0.75%, by weight.
[3] Domino honey granules; moisture content less than 1.5% by weight.
[4] Cargill 478C, a cottonseed blend having a melting point of 120° F.
[5] Flavors of North America #926.387; Chicago, Illinois.
[6] McCormick and Co., Inc. F51880; Sparks, MD.
[7] Tastemaker #257,077; Cincinnati, Ohio.
[8] Karo light corn syrup; CPC International.
[9] Cargill 478C.
[10] Lecithin; Sentral Soya product 6648; Ft. Wayne, Indiana.

The caramel flavor/sweetener blend was prepared by melting and holding the oil at a temperature of 135° F. (57° C.). The sugars and flavors were blended in, with mixing for a total of two minutes.

The corn syrup blend was prepared by melting and holding the oil at a temperature of 135° F. (57° C.). The emulsifier was added with mixing for two minutes. Then the corn syrup was poured in with continuous mixing, until the corn syrup and oil were observed to be homogeneous.

The product was prepared as follows. Fifty-five grams of popcorn were placed in a microwave popcorn bag. The bag was generally according to U.S. Pat. No. 5,044,777, FIG. 2. Fifty grams of the caramel/sweet slurry were added to the bag. Finally sixty grams of the corn syrup slurry were added to the bag. The bag was sealed.

To conduct popping, the bag was placed in a 600 watt microwave oven and the product was cooked on high for 3 minutes.

The resulting product was acceptable for consumption.

EXAMPLE 2 (Caramel Flavor without Brown Sugar)

This example presents a preferred formulation and method for the preparation of a commercially acceptable caramel flavored popcorn, without brown sugar. The example is formulated to prepare a bag of product containing about 48 grams of unpopped popcorn (360–390 kernels).

The compositions of the two blends are as follows:

| | |
|---|---|
| The Sweetening Blend | |
| Fine grind granulated sugar[11] | 20.93 g |
| Honey flavored granules[12] | 2.88 g |
| Oil[13] | 24.0 g |
| Vanilla flavor[14] | 0.9 g |
| Butter flavor[15] | 0.9 g |
| The Corn Syrup Blend (with Caramel Flavor) | |
| Light corn syrup[16] | 42.90 g |
| Oil[17] | 10.450 g |
| Emulsifier[18] | .55 g |
| Caramel flavor[19] | 1.10 g |

[11] C&H extra fine grind granulated sugar.
[12] Domino Honey flavored granules.
[13] Cargill 478C.
[14] Flavors of North America #926.387.
[15] Tastemaker #257,077.
[16] Karo light corn syrup, CPC International.
[17] Cargill 478C.
[18] Lecithin; Sentral Soya #6648.
[19] McCormick F51880.

The caramel flavor/sweetener blend was prepared by melting and holding the oil at a temperature of 135° F. (57° C.). The sugars and flavors were blended in, with mixing for a total of two minutes.

The corn syrup blend was prepared by melting and holding the oil at a temperature of 135° F. (57° C.). The emulsifier was added with mixing for two minutes. Then the corn syrup was poured in with continuous mixing, until the corn syrup and oil were observed to be homogeneous.

The product was prepared as follows. 48 g of popcorn were placed in a microwave popcorn bag. The bag was generally according to U.S. Pat. No. 5,044,777, FIG. 2. 48 grams of the sweetened slurry were added to the bag. Next 55 g of the corn syrup slurry was added to the bag. The bag was sealed.

To conduct popping, the bag was placed in a 600 watt microwave oven and the product was cooked on high for 3 minutes.

The resulting product was acceptable for consumption.

EXAMPLE 3: (Formulation for Butter Toffee Flavored Popcorn)

| Ingredient | g/bag |
|---|---|
| Corn | 48.00 g |
| Sweetening Blend 48 g/bag | |
| High Melt Oil (Cargill 478C) | 23.500 g |
| C + H Fine Grind Granular Sugar | 19.850 g |
| Domino Honey Granules | 3.840 g |
| CH Butter Flavor 50EX SD | 0.070 g |
| TM Toffee Flavor 257081[20] | 0.480 g |
| FNA Vanilla Flavor 926.387[21] | 0.240 g |
| Glazing Blend 55 g/bag | |
| Karo Light Corn Syrup (CPC) | 44.000 g |
| High Melt Oil (Cargill 478C) | 10.450 g |
| Lecithin (Sentral Soya) | 0.550 g |

[20] TasteMaker, Cincinnati, OH
[21] Flavors of North America Northfield, Illinois 60093

The blends and product mixture can be prepared and used by procedures analogous to those described for Examples 1 and 2.

EXAMPLE 4 (Chocolate Flavored Popcorn)

| Ingredient | g/bag |
|---|---|
| Corn | 48.00 g |
| Sweetening Blend 48 g/bag | |
| High Melt Oil (Cargill 478C) | 23.500 g |
| C + H Fine Grind Granular Sugar | 14.880 g |
| Van Houten Chocolate Powder 75-944[22] | 9.600 g |
| Glazing Blend 55 g/bag | |
| Karo Light Corn Syrup (CPC) | 44.000 g |
| High Melt Oil (Cargill 478C) | 10.450 g |
| Lecithin (Sentral Soya) | 0.550 g |

[22] Van Houten Company St. Albans, VT 05478

The blends and product mixture can be prepared and used by procedures analogous to those described for Examples 1 and 2.

EXAMPLE 5: (Honey Cinnamon-Flavored Popcorn)

| Ingredient | g/bag |
|---|---|
| Corn | 48.00 g |
| Sweetening Blend 48 g/bag | |
| High Melt Oil (Cargill 478C) | 23.500 g |
| C + H Fine Grind Granular Sugar | 18.240 g |
| Domino Honey Granules | 3.600 g |
| Savannah Ultra Dry Honey[23] | 0.960 g |
| CH Butter Flavor 50EX SD[24] | 0.240 g |
| McClancy Honey Cinnamon Flavor 1704[25] | 1.440 g |
| Glazing Blend 55 g/bag | |
| Karo Light Corn Syrup (CPC) | 44.000 g |
| High Melt Oil (Cargill 478C) | 10.450 g |

-continued

| Ingredient | g/bag |
|---|---|
| Lecithin (Sentral Soya) | 0.550 g |

[23]Savannah Foods & Industries Inc. Minnetonka, MN 55343
[24]Chr. Hansen's Laboratory Inc. Milwaukee, WI
[25]McClancy Seasoning Co. Fort Mill, South Carolina 29715

The blends and product mixture can be prepared and used by procedures analogous to those described for Examples 1 and 2.

EXAMPLE 6: (Honey Butter Flavored Popcorn)

| Ingredient | g/bag |
|---|---|
| Corn | 48.00 g |
| Sweetening Blend 48 g/bag | |
| High Melt Oil (Cargill 478C) | 23.500 g |
| C + H Fine Grind Granular Sugar | 19.780 g |
| Domino Honey Granules | 3.840 g |
| Savannah Ultra Dry Honey[26] | 0.480 g |
| TM Butter Flavor 257077[27] | 0.380 g |
| Glazing Blend 55 g/bag | |
| Karo Light Corn Syrup (CPC) | 43.290 g |
| High Melt Oil (Cargill 478C) | 10.450 g |
| Lecithin (Sentral Soya) | 0.550 g |
| Honey | 0.720 g |

[26]Savannah Foods & Industries Inc. Minnetonka, MN
[27]Tastemaker Cincinnati, OH The blends and product mixture can be prepared and used by procedures analogous to those described for Examples 1 and 2.

What is claimed is:

1. A microwavable mixture useable in preparing a microwavable popcorn product with a sugar based flavoring; said mixture comprising:
   (a) unpopped popcorn;
   (b) a sweetening blend mixed with the unpopped popcorn; the sweetening blend comprising:
      (i) an oil component having a melting point of at least 115° F.; and,
      (ii) a crystalline sugar component having a moisture content of no greater than about 2% by weight; a weight ratio of sweetening blend to unpopped popcorn in the microwavable mixture being within the range of 0.5/1 to 1.5/1;
   (c) a glazing blend mixed with the unpopped popcorn, the glazing blend comprising a mixture of corn syrup and an oil having a melting point of at least 115°F.; said glazing blend including:
      (i) a sufficient amount of corn syrup to coat the unpopped corn;
      (ii) a sufficient amount of emulsifier to provide a homogeneous mixture of the corn syrup and the oil in the glazing blend;
      (iii) 10-20% by weight of the oil; and,
      (iv) 80-90% by weight corn syrup; and,
   (d) a total NaCl content, if any, in the glazing blend and sweetening blend together, of no more than about 200 mg per 100 g total of glazing blend and sweetening blend.

2. A microwavable mixture according to claim 1 wherein:
   (a) the sweetening blend comprises 35-55% by weight sugar; and, 35-55% by weight of oil having a melting point of at least 115° F.

3. A microwaveable mixture according to claim 1 wherein:
   (a) the crystalline sugar component has a moisture content of no greater than about 1.5% by weight.

4. A microwaveable mixture according to claim 1 wherein:
   (a) the crystalline sugar component comprises granulated sugar.

5. A microwaveable mixture according to claim 1 wherein:
   (a) the glazing blend and the sweetening blend together have a total moisture content of no more than about 14% by weight.

6. A microwaveable mixture according to claim 1 wherein:
   (a) the oil in the sweetening blend, having a melting point of at least 115° F., comprises food grade cottonseed oil blend having a melting point of about 120° F.; and,
   (b) the oil in the glazing blend having a melting point of at least about 115° F. comprises food grade cottonseed blend oil having a melting point of about 120° F.

7. A microwaveable mixture according to claim 1 wherein:
   (a) the sweetening blend includes:
      (i) as the crystalline sugar component a mixture of white sugar and honey-flavored sugar granules; and,
      (ii) vanilla and butter flavoring; and,
   (b) the mixture includes a caramel flavoring.

8. A method of preparing sweetened popcorn; said method comprising the steps of:
   (a) mixing unpopped popcorn with:
      (i) a sweetening blend comprising an oil component having a melting point of at least 115° F. and a crystalline sugar component having a moisture content of no greater than about 2% by weight; a weight ratio of sweetening blend to unpopped popcorn being within the range of 0.5/1 to 1.5/1;
      (ii) a glazing blend comprising a mixture of corn syrup and an oil having a melting point of at least 115° F.; the glazing blend including: a sufficient amount of corn syrup to coat the unpopped popcorn; a sufficient amount of emulsifier to provide a homogeneous mixture of the corn syrup and the oil in the glazing blend; 10-20% by weight of the oil; and, 80-90% by weight corn syrup; and
      (iii) control of NaCl presence in the glazing blend and sweetening blend together such that no more than about 200 mg of NaCl is present per 100 g total of glazing blend and sweetening blend.

* * * * *